United States Patent Office 3,066,787
Patented Dec. 4, 1962

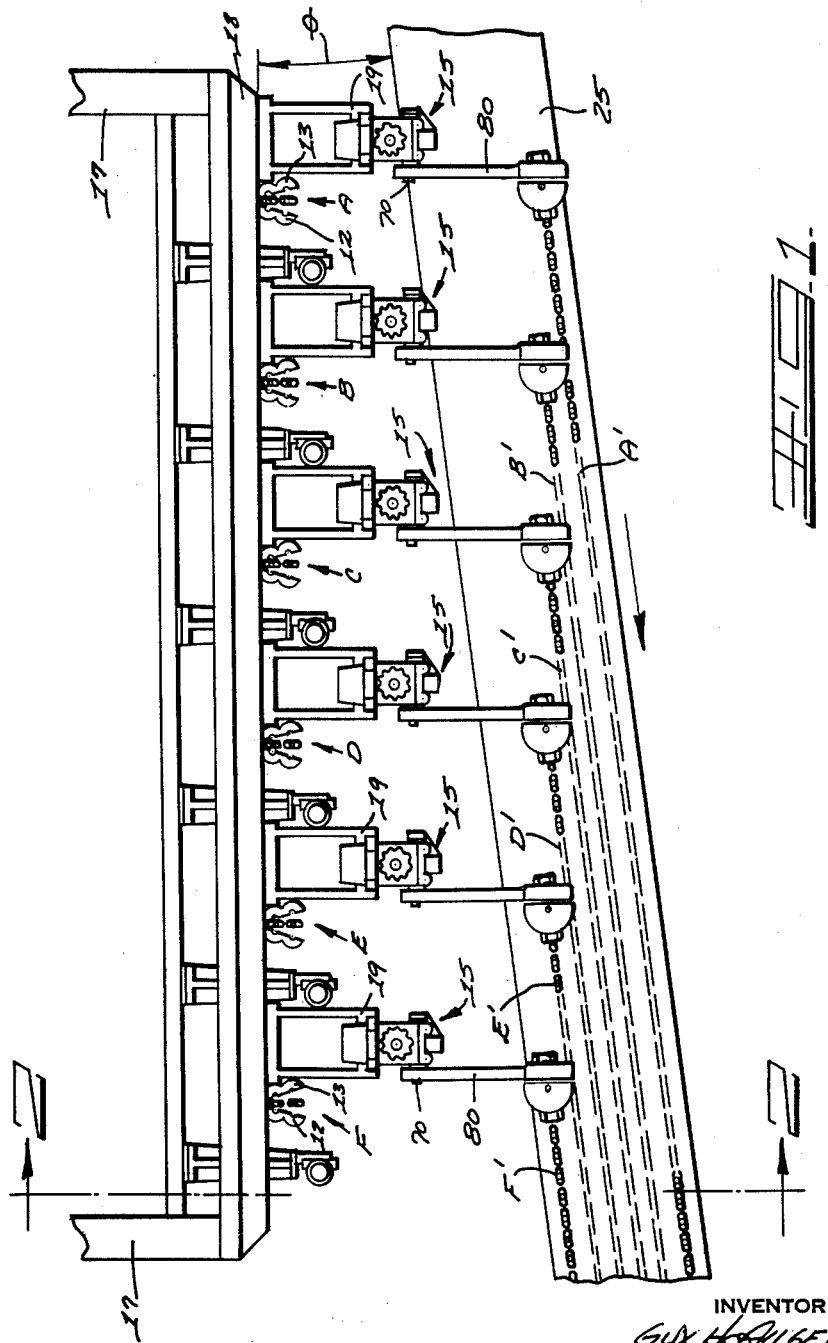

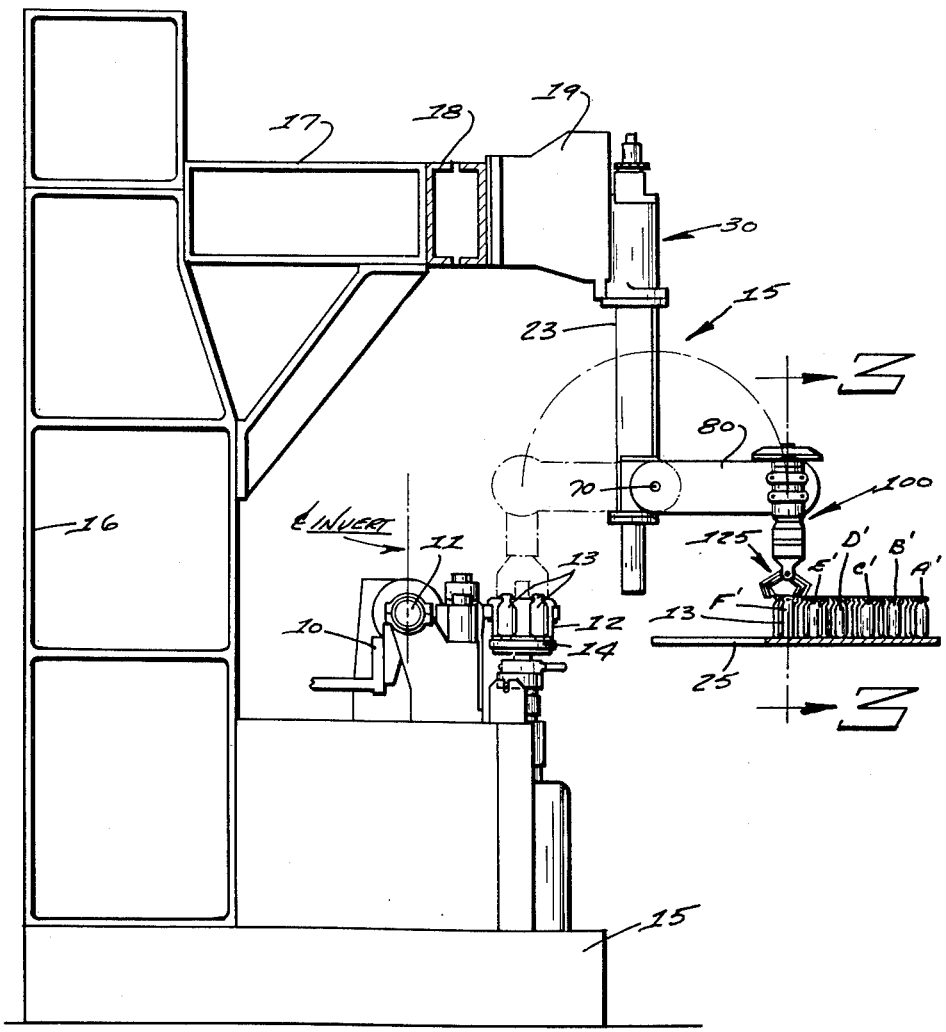

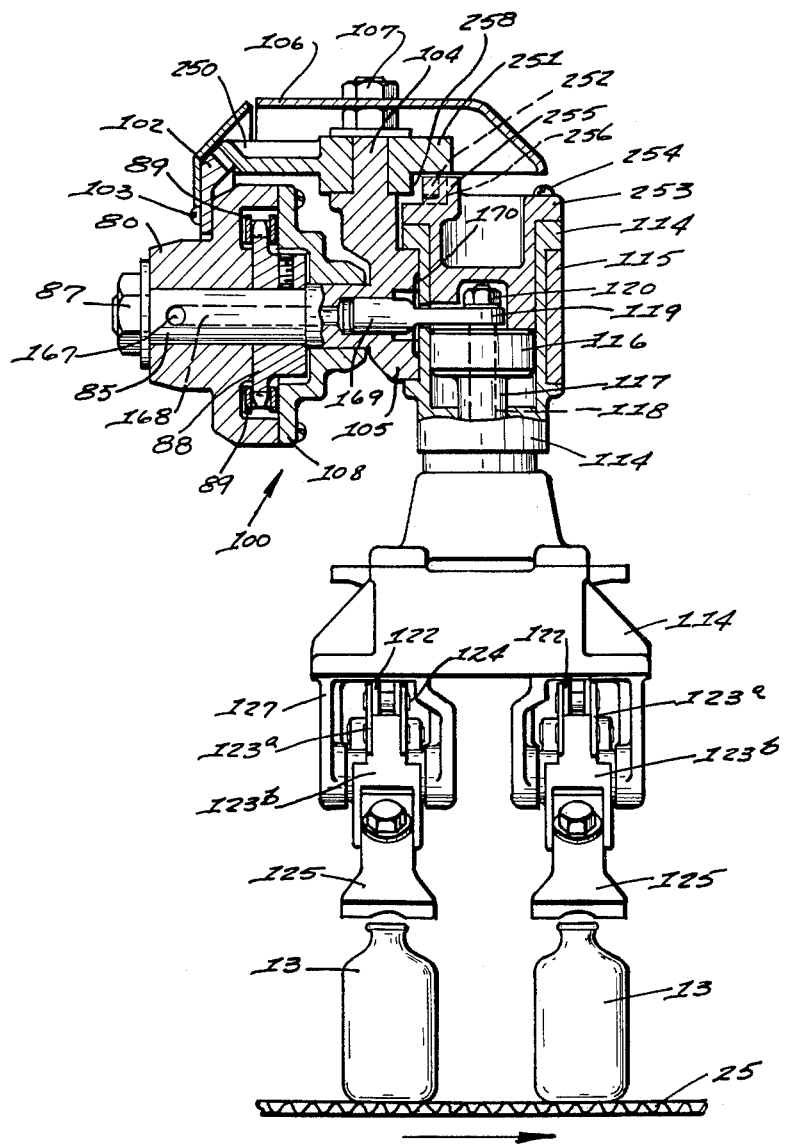

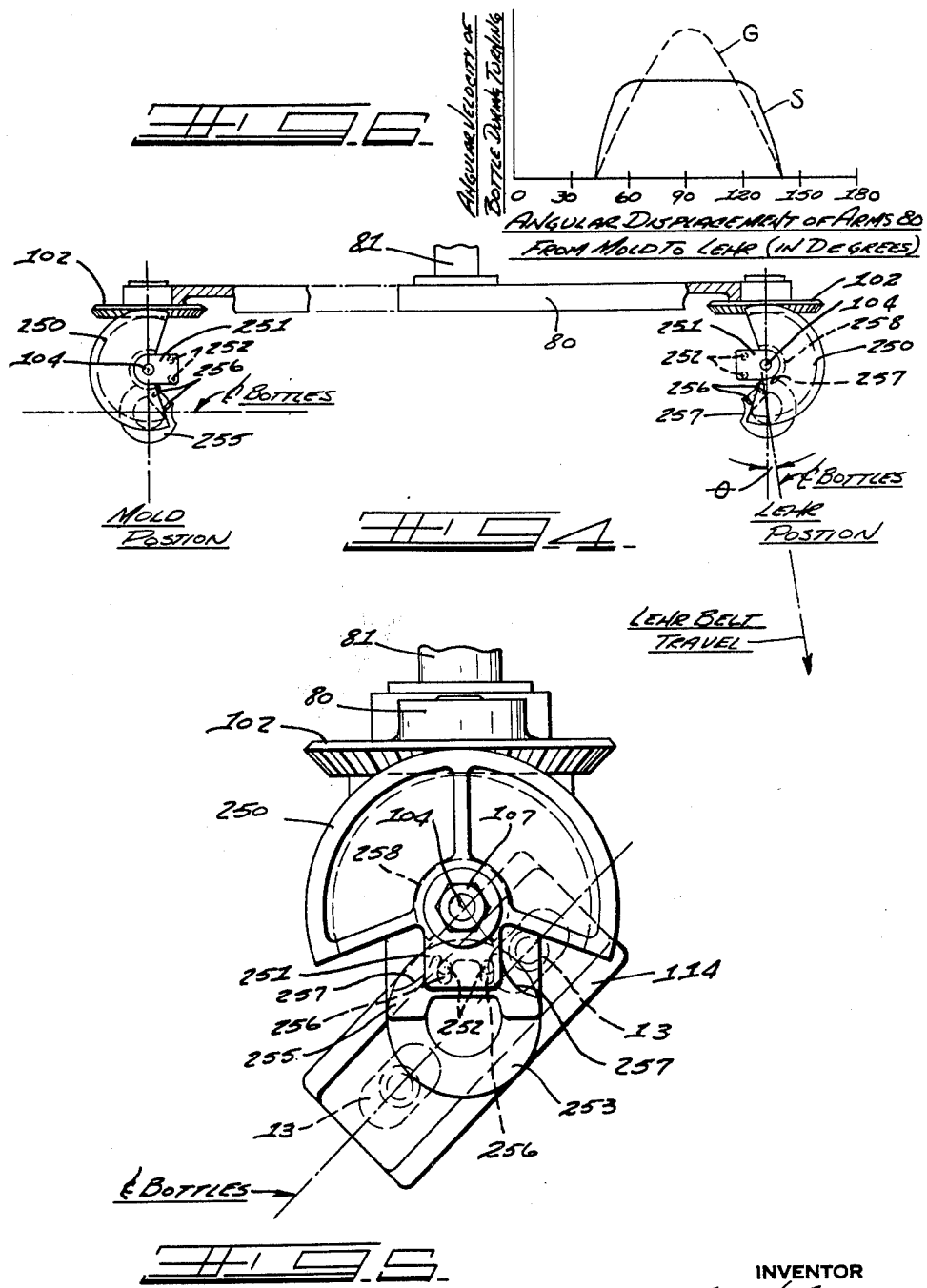

3,066,787
METHOD FOR HANDLING GLASSWARE ARTICLES
Guy H. Allgeyer, Godfrey, Ill., assignor to Owens-Illinois Glass Company, a corporation of Ohio
Original application Sept. 15, 1958, Ser. No. 761,114. Divided and this application July 27, 1959, Ser. No. 829,645
5 Claims. (Cl. 198—30)

The present invention relates to handling glassware articles formed by machine, and more particularly, to method for transferring successively formed glassware articles from a receiving station, such as the finishing mold bottom plates, to a delivery station, such as a moving conveyor of a lehr, and depositing them on the latter in a predetermined pattern and position of orientation.

The present invention is an improvement of the method disclosed and claimed in my copending application, Ser. No. 740,020, filed June 5, 1958; and this application is a divisional of my copending application, Ser. No. 761,114, filed September 15, 1958.

With reference to that application, it should be noted that the method for transfer of the articles from a receiving station to a delivery station is accomplished by removing the ware from the plural mold mechanisms of the machine in individual transfer paths, each of these paths being of different length. The ware is then deposited on separate rows moving on a horizontal surface at the delivery station to complete each transfer so that individual rows may be formed of ware transferred from each molding mechanism. Also, the apparatus therein disclosed for performing such transfer includes transfer devices employing a pivotal transfer arm on each, the transfer arms of all the devices being unequal in length and pivoted about individual horizontal axes spaced at different distances from the molds of the plural sections of the machine which the transfer devices are servicing. As illustrated on the drawings in the aforementioned disclosure, a 6-section "IS" machine will require six different sizes of mounting supports for achieving the variation in spacing of the horizontal axes of the transfer arms from their respective mold bottom plates of the forming mechanisms of the machine, and six different length transfer arms. This will require keeping a stock of six different sets of these parts for maintaining and repairing the transfer devices. Obviously, on a 5-section machine, five sets of parts must be kept on hand, etc.

The present invention provides for and includes as one of its objects, improved method for taking formed ware from the finishing molds of the plural section forming machine and placing the ware directly on a moving lehr mat or conveyor and in individual rows, the transfer of the ware from its mold at each section of the machine being effected in individual paths of movement, and each of those paths being substantially the same length. The present invention, therefore, provides for the utilization of transfer devices at each section of the machine that are similarly constructed and the parts of each interchangeable so as to obviate the above-mentioned problem connected with keeping a multiplicity of stocks of various sized parts. Under the present invention, the transfer devices are capable of being easily and more economically maintained.

Another object of the invention, taken in conjunction with the foregoing object, is the provision for moving the lehr mat past the sections of the machine successively in a direction that is angularly divergent from the alignment of the molds of the successive sections of the plural section machine so that the ware being transferred through equal length paths from each section after forming at each section of the machine will be delivered to the lehr mat at different lateral locations thereon, thus forming individual rows of ware being advanced from their delivery station after successive transfers from each section of the machine.

By having the lehr mat angularly disposed with relation to the longitudinal alignment of the molds on the machine, the ware, in order to be properly oriented, must be rotated an additional angular amount beyond the rotation thereof performed in my copending application. For example, if double gobbing operation is being performed on the machine and each pair of bottles being transferred is to be placed into the same longitudinal row on the lehr conveyor, the ware must be rotated 90° plus or minus the angular relationship between the longitudinal alignment of the molds on the machine and the direction of travel of the lehr conveyor.

Furthermore, it has been found that during this orientation, rotation of the ware for turning about its longitudinal axes during transfer from the mold to the conveyor must be performed in a relative short span of that transferring movement so that sufficient movement during transfer has taken place in order that the ware clears the mold before turning movement begins and turning movement ends prior to delivery of the ware to the conveyor. By turning the bottles through a drive mechanism having characteristics of velocity conforming to a sine wave or contiguously accelerating and decelerating turning movement will tend, through the centrifugal forces exerted during that movement, to deform or bend the bottles in their semi-plastic condition such as exists just subsequent to forming the bottle and while the transfer is taking place.

It is, accordingly, another important object of the present invention to provide improved method for performing the desired amount of turning movement or rotation of the bottle about its own vertical axis, whereby, during such movement, an initial period of acceleration followed by a contiguous period of constant velocity and ending with a contiguous period of deceleration.

Other objects of the present invention will become apparent from a reading of the following description of a practical embodiment, the appended claims, and the accompanying drawings of said embodiment to which reference is made and in which:

FIG. 1 is a partial plan view of a 6-section "IS" glass forming machine which illustrates one form of novel apparatus utilized for performing the improved bottle turning method of the present invention.

FIG. 2 is a side elevational view, partly in section, of one section of the machine, and is taken along line 2—2 of FIG. 1.

FIG. 3 is a sectional elevational view taken along line 3—3 of FIG. 2.

FIG. 4 is a plan view showing the transfer arm of one of the transfer devices of the present invention and its rotational drive mechanism for rotating the tongs mechanism for effecting the improved rotational or turning movement of the ware during transfer. The transfer arm and associated drive mechanism for the tongs mechanism is shown in its extreme operating positions, one being at the mold position or the ware receiving station and the other at the lehr position or the ware delivery station.

FIG. 5 is a plan view showing the details of the improved rotational drive mechanism, as viewed at the intermediate position during swinging movement of the transfer arm between the mold position and the lehr position.

FIG. 6 is a graph showing the comparison of angular velocity between turning a bottle during transfer under the improvement of the present invention and similarly turning a bottle during transfer using a Geneva drive mechanism.

The present invention, in one novel form, is adapted to take ware from a blow mold of the forming machine and put it directly onto a moving belt of a lehr conveyor which is arranged to travel past the molds successively and thence through an annealing lehr. The transfer is accomplished without intermediate handling of the ware. In the use of high speed glassware forming machines, such as the well-known Hartford-Empire "IS" machine, having a plurality of ware forming mechanisms or sections, the lehr loading operation necessitates various operations during transferring movement for orienting the ware on the conveyor, as well as providing for a properly timed transfer.

As see from FIG. 1, the final or blow mold side of a 6-section "IS" machine is shown, each section having a ware forming mechanism which includes a gob delivery mechanism, a blank mold, and cooperating neck ring, none of these being shown but may be readily understood by reference to U.S. Patent No. 1,911,119, issued to H. W. Ingle. The neck ring is carried on an invert mechanism 10 (FIG. 2) which is pivoted sequentially about a pivot 11 to successively bring the blank or parison shapes of glass to final blow molds 12. In FIG. 2, the final blow molds are illustrated as double cavity molds, the operation of which is generally known in the glass forming industry as double gobbing operation or double gobbing molds. The blow molds 12 are open and closed according to a timed operational cycle of the forming mechanism to form finished containers 13. The formed containers, when the molds are open, are supported on mold bottom plates 14 in an upright position so that their central axes are vertical.

This same type of forming machine is often operated for single gobbing operation by use of single gobbing or single cavity molds, in which case the containers 13 are formed one at a time. In my above-referred to copending application, such a single gobbing transfer device is completely described, and for the purposes of the present invention, the same tongs mechanism numbered therein 212 (FIG. 20) may be substituted for the tongs mechanism described herein for effecting transfer of ware on a machine such as that illustrated in the drawings of the present invention in which double gobbing operation is illustrated.

On FIG. 1, the plurality of forming mechanisms of the 6-section "IS" machine is designated by the reference letters A—E. The machine includes a longitudinally disposed beam or frame member 18 which is parallel to and overlies the longitudinally aligned finishing molds 12 of the six forming mechanisms of the machine. Opposite each of the forming mechanisms A—F are alike bracket members 19 which are integrally connected to the overhead frame member 18 and project horizontally outwardly to form the same amount.

As the outer end of each bracket member 19 is an adjustable mounting for attaching the glassware transfer device, referred to generally at 15, which device will be presently described. Each mounting is constructed similarly and includes a vertical slideway in the bracket 19, and cooperating T-slide. The T-slide is integrally connected with the vertical frame casting 23 (FIG. 2) which houses the cylinder-piston motor 30 of the transfer device 15. This mounting assembly for each of the transfer devices 15 on their bracket 19 is fully disclosed in detail in my aforementioned copending application. The one difference in this mounting in the present device resides in the fact that each of the brackets 19 projects horizontally from the frame member 18 the same distance so that the pivot point (horizontal axis) 70 for each of the transfer devices 15 is aligned parallel to the blow mold bottom plates 14 of the various forming mechanisms A—F.

With the above description describing the setting for the improvement of the present invention, one of its novel features will now be described. As indicated in FIG. 2 which shows an elevational section of the transfer device 15 for servicing forming mechanism or section F of the 6-section "IS" machine, each transfer device 15 includes a transfer arm 80 which is pivotally mounted for swinging about a horizontal axis or shaft 70. The swinging movement of arm 80 is performed through the actuation of the vertically reciprocating cylinder-piston motor 30, which is actuated and controlled in the same manner as described in my aforementioned copending application.

The arm 80 of each transfer device 15 is driven in oscillating cycles between its ware receiving position over its corresponding mold bottom plate 14 and over the upper span 25 of a lehr mat or belt conveyor. This lehr mat or conveyor surface 25 is adapted to travel through an annealing lehr chamber, thence through a cooling area and finally to a storing or unloading area where the annealed and cooled ware is removed. As mentioned before, the lehr mat span 25 is arranged to travel in endless fashion in a direction of movement which is at a predetermined acute angular relationship with the center line of the longitudinal alignment of the final blow molds 12 of the forming mechanisms or sections A—F of the forming machine. This angular relationship is designated by the Greek symbol "theta" on FIG. 1 of the drawings. Since, as mentioned, each of the transfer paths of ware transferred from their forming sections is alike, the size of the angle "theta" will determine the lateral spacing between the rows A'—F' of ware (bottles 13 on FIG. 1) being delivered to the lehr mat 25 by the transfer devices 15. Thus, the spacing between the rows A'—F' may be determined as a function of horizontal distance between centers of two adjacent molds 12 times the sine of the angle "theta." For example, one arrangement found to be practical for unloading small narrow neck bottles is to cant or angularly dispose the travel of the lehr mat 25 at an acute angle of 7° 7' (the angle "theta") as measured from a line parallel to a center line along the longitudinal alignment of the plural molds 12. On the standard "IS" machine this will result in a center-to-center spacing of the ware between the rows A'—F' of 2⅝ inches, measured laterally on the lehr mat 25.

During operation of the forming machine, the bottles 13 are brought in succession to the ware receiving position on the mold bottom plates 14 and after the molds 12 open the bottles are upright and ready for transfer. The bottles are grasped and picked up by a double pair of transfer tongs 125 carried at the lower end of the transfer mechanism 100 and then removed from the mold bottom plates by actuation of the arm 80 in a clockwise swinging movement about horizontal axis 70. The transfer requires a certain amount of swinging movement to clear the mold mechanism, which, in the usual case, is about 40° of rotation of the arm 80. During the transfer, the ware is held upright and after it clears the mold, is rotated about a vertical axis for turning the ware to an orienting position ready for delivery in a row on the lehr mat 25. This rotation becomes necessary if the machine is operating for double gobbing operation or if producing irregularly shaped ware, such as "panels," by either single or double gobbing operation. In the case of irregularly shaped ware, it is placed in a line or row, such as rows A'—F', with the greater dimension of the ware aligned with the direction of movement of conveyor 25. This will achieve maximum stability against upset of the ware in the direction of lehr mat travel. Also, efficient organization of the rows of the ware transferred from the various sections of the multiple section machine is important. For example, to conserve space on the lehr mat and permit the most efficient operation of the lehr, the ware must be loaded compactly. Prior to the release of the ware to the lehr and during transferring movement, it is contemplated in this invention to also orient one article with the other as the double-gob ware is being placed in a single row, such as, by closing the center distance between the pair of bottles undergoing transfer by a horizontal movement of the bottles toward each other.

Referring again to FIG. 2, the details of the mechanism for turning the ware during the swinging movement of the transfer arm 80 will be described. In connection with this description, only a summary of the construction of the mechanism will be herein mentioned, and a more detailed explanation and description of the mechanism's operation and construction may be found in my aforementioned copending application.

A tongs mechanism referred to generally at 100 is mounted at the outer end of transfer arm 80 of each of the transfer devices 15. The upper part of the tongs mechanism 100, in the present invention, includes a star wheel drive unit comprising a star wheel driver 250 which is in mesh and adapted to be driven by a bevel gear tooth element 102 rigidly held at the outer end of the transfer arm 80 by cap screws 103. The star wheel driver 250 is pivoted on a vertical shaft 104 which is formed as an integral part of a casting 105. The tongs mechanism 100 is assembled to the transfer arm 80 by the shaft 85, which is also integrally cast as a part of casting 105, and shaft 85 is journaled through a bearing in spider casting 108 bolted to the arm 80, through the sprocket 88 and through arm 80 and held by nut 87.

Referring briefly to FIG. 5, the star wheel driver 250, as seen in plan view, includes an arm segment 251. This arm segment has a pair of spaced apart and downwardly depending driver pins 252.

Referring again to FIG. 3, a hub 253 is rigidly connected, such as by screw 254, within a cylindrical holder sleeve 114. The holder sleeve 114 is trunnion mounted to the casting 105 by a connector bearing 115. The combination of the hub 253 being inserted in and held in place in sleeve 114 forms a head-end portion of a cylinder-piston motor having a piston 116 carried in the lower end (cylinder portion) of the holder sleeve 114. The piston rod 117, which is attached to the lower side of piston 116, is hollow and accommodates a cylindrical rod 118 which extends through the piston. The upper end of rod 118 has a square end portion fitted with a wrench lever 119. The wrench lever is rigidly held by the casting 105 and held in place on the upper segment end of the rod 118 by a nut 120.

The hub 253, as seen in FIG. 5, has an integral vertical extension which forms a star wheel driven element. This driven element 255 has a pair of slots 256 spaced to accommodate the driving pins 252. The slots 256 are cut and take the form of an epicycloid gear tooth.

As seen in FIG. 4, the transfer arm 80 will begin its swinging cycle during transfer of ware at the mold position (left-hand side of FIG. 4). Since the bevel gear segment 102 is held in a fixed rotational relationship with the hub 81, the gear segment 102 will drive the star wheel driver 250 clockwise. The star wheel mechanism is arranged so that after the arm 80 has swung through about 40° of rotation, one of the driving pins 252 will enter in a nearby slot 256 of the driven element 255. As the arm 80 continues to swing and continues to drive the star wheel driver 250, the first of the driver pins 252 begins to impart rotation in the counterclockwise direction to the driven element 255 which, as was previously mentioned, is connected rigidly with hub 253. The hub 253, being rigidly connected to the sleeve 114, will impart this counterclockwise rotation to the two pairs of tongs 125 holding bottle 13. As long as only the one driving pin 252 is engaged in the slot 256, as mentioned, the driven element 255 will accelerate, beginning from rest, in rotational or angular velocity. This acceleration will continue until the second driving pin 252 engages with its corresponding slot 256 in element 255, at which time the driving connection between the star wheel driver 250 and the star wheel driven element 255 will impart a constant angular velocity, as would a pair of meshing epicycloid gears. This constant period will begin after about 60° of swinging movement of the arm 80 and will continue until the arm has rotated about 120° of total swinging rotation (see curve identified as S, FIG. 6). At this latter-mentioned point, the first engaged driving pin 252 will diverge and leave its slot 256, at which time a period of deceleration will commence. This deceleration will continue until the second engaged driving pin 252 disengages by divergence out of its slot 256. After this point, the driven element 255 will be at rest. The driven element 255 is held against further rotation, such as by vibration, etc., by the concave arcuate surface 257 fitting snugly against a hub 258 on the underside of the star wheel driver 250 (see FIGS. 3, 4, and 5). The rotation or turning movement of the tongs and the ware held thereby is completed in the example illustrated on FIG. 4 when the arm has rotated about 140°. During the remainder of the swinging movement, the star wheel driver 250 rotates the driving pins 252 to the position shown at the right-hand side of FIG. 4.

During the transfer just described, the bottles are picked up with their centers lying along a line that is parallel to the transfer arm, and, during movement, the described star wheel mechanism rotates the ware so that their centers lie along a line that is parallel to the direction of movement of the lehr belt 25. At this point, the tongs 125 release the ware to the conveyor and add the ware to the single file row on the proper lehr mat. This turning movement or rotation amounts to 90° plus the angle "theta," or, for the example illustrated on FIG. 4 and in these drawings, 97°7′.

It is believed that the just-described mechanism for rotating the tongs mechanism during ware transfer is especially significant in that it may be constructed to impart rotation, during a swinging cycle of the arm, through an odd increment of a circle such as the angular displacement illustrated herein (97°7′).

A further advantage of the turning movement of the bottles according to the present invention is illustrated on FIG. 6. On that figure, the angular displacement or movement of the arm 80 in its swinging movement from its mold position to its lehr position is plotted along the abcissa and indicated in degrees. Angular velocity of the ware during its turning movement is plotted along the ordinate. Two curves are shown on the graph, the curve designated "G" representing the circumstances of turning of the bottles during transfer when a contiguously accelerated-decelerated type of drive is employed, for example, the Geneva type drive; and the other curve S showing the circumstances of turning velocity of the ware when a drive according to the present invention is employed. Since the two drives, represented by "G" and "S," are compared under the same conditions for turning ware, that is, turning movement begins at the same point of angular displacement of arm 80 and it ends after the same amount of angular displacement of arm 80, the area under the curves "G" and "S" must be equal. It is, therefore, obvious by inspection of the curves that the contiguously accelerated-decelerated type drive achieves a greater peak of angular velocity of the bottle during the turning movement, whereas, under the type of drive mechanism and method described for the present invention, the peak velocity is noticeably less. When ware transfer is performed, the glass in the ware has not yet had an opportunity to fully "set-up" or rigidify and, therefore, the articles are semi-plastic and deformable from their molded shape. This feature of the present invention is important from the standpoint that, on transferring larger ware, there is less tendency for distorting or bending the hot articles of ware by the centrifugal force exerted on them during the turning movement. The centrifugal force, as is well known, would be measured as a function of: (1) the angular velocity of the bottle during its turning movement, and (2) the spacing or radius of the center of gravity of the bottle from the axis about which its turning movement is generated.

In the present invention for double gobbing operation, it is preferred to use the type tongs mechanism described in my aforementioned copending application in which, during transferring movement, the pairs of transfer tongs 125 are closed or moved toward each other by their slideable mounting on the sleeve holder casting, so as to decrease the ware center distance when the arm 80 is swinging from the mold position to the lehr position. The two pairs of tongs 125 are actuated by the slider-crank mechanism described in said copending application. Utilizing this mechanism in the construction of the tongs mechanism 100 in the present invention will allow compacting each pair of ware transferred into a given row on the lehr mat.

Each pair of tongs 125 operates to open and close about the necks of the ware 13 and is normally held in its open position by spring pressure. As disclosed in my copending application, the tongs 125 are closed at the proper time during the transfer cycle by the introduction of fluid pressure at the head end of the cylinder-piston motor in sleeve holder 114. This pressure fluid is conducted to and from the cylinder-piston motor through a line 167 into the core of shaft 85, then along connecting axial bore 168 and through the hollow center of cylindrical member 169. At the proper point in the transfer cycle and when the ware is to be released, pressure fluid is turned off and exhausted from the head end of this cylinder-piston motor, and the two pairs of transfer tongs 125 are allowed to open by the spring pressure.

In the foregoing description of the drawings, the same reference numerals are used herein to identify parts of the mechanism as are used to identify similar mechanism in the description contained in my aforementioned copending application Serial No. 740,020.

It is contemplated that various modifications and arrangements may be resorted to, but it is intended that a patent granted hereon should not be limited otherwise than by the scope of the appended claims.

I claim:
1. The method of transferring hot, deformable glassware articles which are successively formed to stand in upright position in the finishing molds of a plural section forming machine, the machine having its plural sections longitudinally aligned in spaced relationship and operated to successively form the hot, deformable ware articles, comprising the steps of gripping the hot, deformable articles while supported by their finishing mold and swinging said article through a vertical arcuate path toward and terminating at a delivery position horizontally disposed from said aligned sections, the articles being maintained upright during said movement, all of said articles being moved through a like arcuate path from their said mold of origin, moving a conveyor continuously in a direction of travel that is at a predetermined acute angular relationship with respect to said longitudinal alignment of said sections of the forming machine so that the conveyor travels successively past each of said sections and beneath all of said delivery positions, and releasing each article at the end of its said arcuate movement and while over said conveyor, whereby the articles transferred from the different sections of the machine are deposited on the conveyor at different lateral positions thereon to form plural single file rows of ware.

2. The method defined in claim 1 wherein each machine section is operated to form said articles in pairs which stand in upright position supported by the finishing mold.

3. The method defined in claim 2, wherein said formed pairs of articles are supported by the finishing mold in aligned relationship perpendicular to said longitudinal alignment of the plural machine sections, and, while swinging the pair of articles through said vertical arcuate path, includes rotating the pair of articles through a predetermined angular displacement about a vertical axis.

4. The method of transferring glassware articles while in a hot, deformable condition and successively formed to stand in upright position in the finishing molds of a plural mold forming machine, the machine having a plurality of longitudinally aligned spaced ware forming mechanisms each forming ware in pairs to stand upright on mold bottom supports with their axes vertical and perpendicular to the alignment of said mechanisms, comprising the steps of directing a conveyor successively past each of said forming mechanisms in a direction that is in predetermined angular relationship with said alignment of said forming mechanisms, transferring the formed articles horizontally in pairs to overlie said conveyor, the transfer comprising gripping each hot, deformable article supported on said bottom supports, lifting the articles in pairs clear of said forming mechanism, maintaining the pair of articles in upright position during the transfer, rotating the pair of articles through a predetermined angular displacement about a vertical axis parallel to the axes of the articles by continuous rotational movement about said vertical axis having first a period of acceleration, next a substantial period of constant velocity, and, finally, a period of deceleration to rest, and releasing each article of ware for support on the conveyor, the articles transferred from different ones of said forming mechanisms being placed on the conveyor in different rows to form a plurality of single file rows thereon.

5. The method defined in claim 4, characterized by the fact that the said acceleration and deceleration periods consume less than one-half of the total time period required said predetermined rotational movement of the ware.

References Cited in the file of this patent

UNITED STATES PATENTS

| | | |
|---|---|---|
| 1,109,284 | Friel | Sept. 1, 1914 |
| 1,691,497 | Rowe | Nov. 13, 1928 |
| 1,905,476 | Lorenz | Apr. 24, 1933 |
| 1,911,119 | Ingle | May 23, 1933 |
| 1,958,846 | Christensen | May 15, 1934 |
| 2,004,492 | McNamara | June 11, 1935 |
| 2,253,155 | Wadman et al. | Aug. 19, 1941 |
| 2,556,469 | Dahms | June 12, 1951 |